United States Patent
Fukui et al.

(10) Patent No.: US 8,233,430 B2
(45) Date of Patent: Jul. 31, 2012

(54) COMMUNICATION METHOD, TERMINAL, AND BASE STATION

(75) Inventors: Noriyuki Fukui, Tokyo (JP); Michiaki Takano, Tokyo (JP); Akihiro Shibuya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1025 days.

(21) Appl. No.: 10/574,607

(22) PCT Filed: Nov. 11, 2003

(86) PCT No.: PCT/JP03/14325
§ 371 (c)(1),
(2), (4) Date: Apr. 5, 2006

(87) PCT Pub. No.: WO2005/046115
PCT Pub. Date: May 19, 2005

(65) Prior Publication Data
US 2007/0121569 A1    May 31, 2007

(51) Int. Cl.
*H04Q 7/00* (2006.01)

(52) U.S. Cl. ........ 370/328; 370/335; 370/342; 370/352; 370/331; 370/433; 370/410; 370/468; 455/464; 455/8; 455/9; 455/10; 455/63.1; 455/67.13

(58) Field of Classification Search .................. 370/252, 370/342, 328, 410, 468, 433, 335, 331; 455/464, 455/8, 9, 10, 63.1, 67, 13
See application file for complete search history.

(56) References Cited

U.S. PATENT DOCUMENTS

| | | | |
|---|---|---|---|
| 5,499,243 A | 3/1996 | Hall | |
| 5,870,380 A * | 2/1999 | Diehl et al. | 370/212 |
| 5,970,056 A * | 10/1999 | Brailean et al. | 370/296 |
| 6,367,045 B1 * | 4/2002 | Khan et al. | 714/748 |
| 7,035,894 B2 | 4/2006 | Park et al. | |
| 7,408,931 B2 * | 8/2008 | LoGalbo et al. | 370/390 |
| 2002/0002064 A1 * | 1/2002 | Park et al. | 455/560 |
| 2002/0028688 A1 * | 3/2002 | Lee et al. | 455/502 |
| 2002/0178250 A1 * | 11/2002 | Haartsen | 709/223 |
| 2002/0181422 A1 * | 12/2002 | Parantainen et al. | 370/337 |

(Continued)

FOREIGN PATENT DOCUMENTS
EP    0 994 596 A2    4/2000

(Continued)

OTHER PUBLICATIONS

3GPP TR 25.896, Release 6, V1.0.0, pp. 1-63, 2003.

*Primary Examiner* — Ajit Patel
*Assistant Examiner* — Fred Casca
(74) *Attorney, Agent, or Firm* — Oblon, Spivak, McClelland, Maier & Neustadt, L.L.P.

(57) ABSTRACT

A terminal transmits a request for a resource assignment to a base station, and acquires a value of a resource for data transmission. The terminal does not transmit the new data to the base station when the resource for data transmission does not exist, and transmits the new data to the base station otherwise, after acquiring the value. The terminal autonomously transmits, when the new data is transmitted to the base station and a NAK signal is received from the base station, the retransmission data to the base station without sending a transmission request to the base station for resources to transmit the retransmission data.

23 Claims, 7 Drawing Sheets

U.S. PATENT DOCUMENTS

| | | |
|---|---|---|
| 2003/0007466 A1* | 1/2003 | Chen .............................. 370/328 |
| 2003/0072266 A1* | 4/2003 | Uesugi et al. ................. 370/236 |
| 2003/0133457 A1* | 7/2003 | Ono et al. ................... 370/395.4 |
| 2003/0185242 A1* | 10/2003 | Lee et al. ....................... 370/491 |
| 2003/0227875 A1* | 12/2003 | Wei et al. ...................... 370/252 |
| 2004/0219917 A1* | 11/2004 | Love et al. .................... 455/436 |
| 2004/0246930 A1* | 12/2004 | Fong et al. .................... 455/436 |
| 2004/0264962 A1* | 12/2004 | Steinhorst et al. .............. 398/59 |

FOREIGN PATENT DOCUMENTS

| | | |
|---|---|---|
| EP | 1 263 160 A1 | 12/2002 |
| EP | 1 294 109 A1 | 3/2003 |
| JP | 10-262256 | 9/1998 |
| JP | 2003-78480 | 3/2003 |
| JP | 2003-219468 | 7/2003 |
| KR | 2001-0090989 | 10/2001 |

* cited by examiner

COMMUNICATION METHOD, TERMINAL, AND BASE STATION

TECHNICAL FIELD

The present invention relates to a communication method that can be implemented in a radio communication system formed with at least one base station and a plurality of terminals (including a single terminal), and more particularly, to a communication method used to perform a retransmission control as an error correction technique.

BACKGROUND ART

As one of conventional technologies, for example, a normal communication process, which is executed in a communication system that includes at least one base station and a plurality of terminals (including a single terminal) located in a service area covered by the base station is explained below.

For example, the base station has a function of selecting a terminal to which transmission permission is given, out of the plurality of terminals that transmit a data transmission request, that is, has a scheduling function, and each terminal performs data transmission basically according to the scheduling.

Specific operations of the base station and each terminal are explained below (see Nonpatent literature 1). At first, a terminal in which data to be transmitted occurs sends a transmission request for data to the base station. Information here as the transmission request, which a terminal reports to the base station, can include, for example, a data amount retained in a buffer and transmission power that can be output by the terminal, or the like. On the other hand, the base station selects a terminal to which transmission permission is given, based on the information received as a transmission request, based on predicted channel quality upon data transmission from each terminal, and based on an allowable interference level upon reception thereof at the base station. Then, the base station returns an assignment signal as a response to the transmission request. At this time, the base station reports the maximum number of bits to be transmitted which are selectable by the terminal, i.e., a transmission rate (Rate) and a transmission permitted time (Time), to the terminal.

The terminal selected based on the assignment signal performs data transmission based on the information received. At this time, the terminal transmits data within the transmission permitted time.

In 3GPP, retransmission control (ARQ: Automatic Repeat reQuest) in the Physical Layer has been studied (see Nonpatent literature 2), in which a base station that receives data from a terminal returns an ACK signal when reception thereof is successful and an NAK signal when reception thereof is failed. When receiving the NAK signal, the terminal sends again a transmission request before retransmission is performed, receives an assignment signal from the base station, and then, transmits again the same data to the base station.
Nonpatent Literature 1:
    3GPP TR25.896 V1.0.0, 7.1.2.2, 7.1.2.3
Nonpatent Literature 2:
    3GPP TR25.896 V1.0.0, 7.2

However, in the communication methods described in the above-mentioned literatures, if a terminal has data that should be transmitted and even if the data is retransmission data, it is necessary to send a transmission request to the base station and receive an assignment signal as a response to the transmission request. Therefore, there is such a problem that because transmission of the retransmission data delays, a data group cannot be transmitted to the upper layer although other data has already been received successfully by the base station.

The base station having sent back the NAK signal does not abandon the data resulting in reception failure, but subjects the data upon reception failure to buffering to be used for combination with the data retransmitted. Therefore, if a delay occurs in the retransmission of the data, the time for using a buffer becomes longer, which causes buffer use efficiency to get worse.

The present invention has been achieved to resolve the conventional problems, and it is an object of the present invention to provide a communication method capable of improving buffer use efficiency at a base station by improving a delay in transmission of retransmission data and to provide a terminal and a base station to execute the communication method.

DISCLOSURE OF THE INVENTION

A communication method according to one aspect of the present invention can be implemented in a communication system including a base station and a terminal, the terminal transmitting a data as a new data to the base station, and upon receiving an NAK signal indicating a reception failure from the base station as a response to the transmission of the new data, transmitting the data as a retransmission data to the base station. The communication method includes a first step for the base station to transmit information on a value of a resource for data transmission that is used for a communication between the base station and the terminal; a second step for the terminal to receive, from the base station, information on the value of the resource for data transmission; a third step for the terminal to transmit a new data to the base station based on the value of the resource for data transmission; and a fourth step for the terminal, to autonomously transmit a retransmission data to the base station without sending a transmission request to the base station for a resource to transmit the retransmission data, in case the new data is transmitted to the base station at the third step and the NAK signal is received from the base station as a response to the new data.

According to the present invention, even if the NAK signal is returned from the base station, the retransmission data is autonomously transmitted without sending a transmission request to the base station for a resource to transmit the retransmission data. Consequently, as compared with the conventional technology in which processes related to sending of a transmission request upon retransmission and reception of an assignment signal are executed, a delay time occurring during transmission of retransmission data can be largely reduced. Moreover, by reducing the delay time, the time for using the buffer for accumulating data, of which reception is failed, is made shorter, thus, largely improving the buffer use efficiency.

BEST MODE(S) FOR CARRYING OUT THE INVENTION

Exemplary embodiments of a communication method, a terminal, and a base station according to the present invention are explained in detail with reference to the attached drawings. It is noted that the present invention is not limited by these embodiment.

Figure 1:
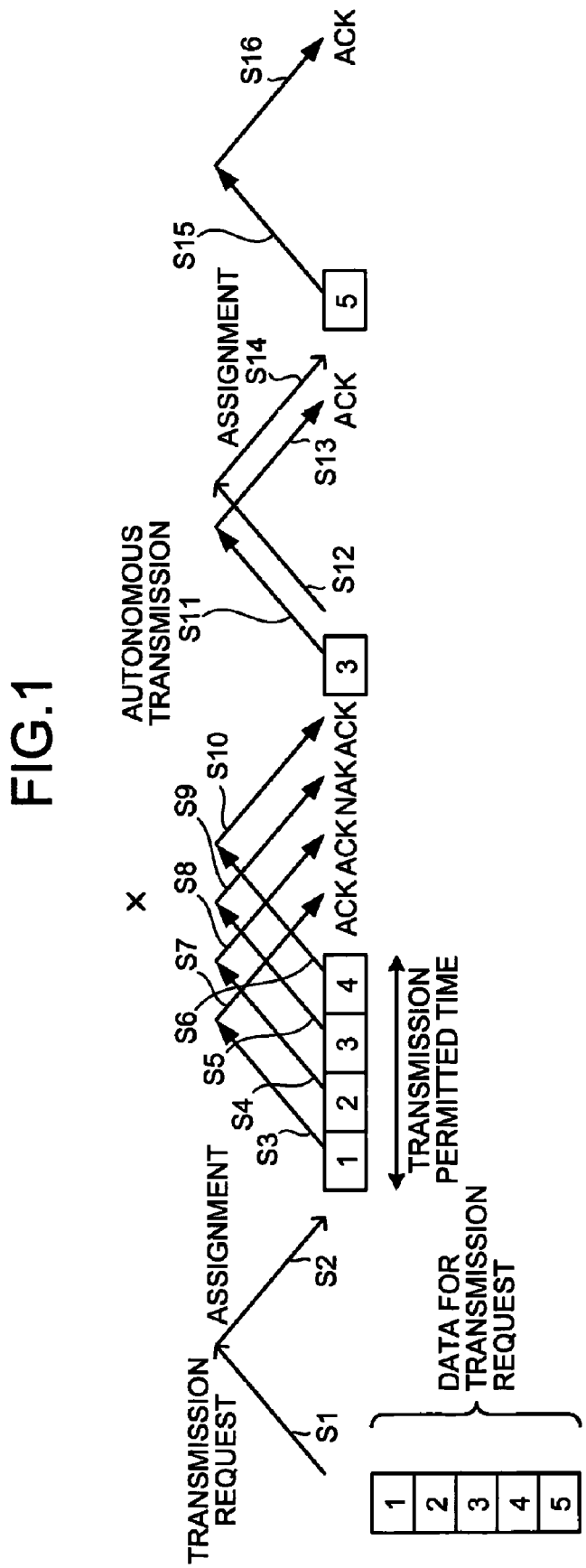
FIG. 1 is a diagram of a communication method according to a first embodiment of the present invention.

FIG. 1 is a diagram of a communication method according to a first embodiment of the present invention, in which a case where a terminal autonomously transmits retransmission data is shown. Assumed in the embodiments is a communication system that includes at least one base station and a plurality of terminals (including one) located in a service area covered by the base station. For convenience in explanation, a case where a terminal transmits five transmission data is explained in the embodiments.

A terminal, in which data to be transmitted (five transmission data shown in FIG. 1) occurs, transmits a transmission request signal to the base station (step S1). Information here as a transmission request signal, which the terminal reports to the base station, can include, for example, a data amount retaining in the buffer and transmission power that can be output by the terminal.

On the other hand, the base station selects a terminal to which transmission permission is given, based on the information received as the transmission request signal, based on predicted channel quality upon data transmission from each terminal, and based on an allowable interference level upon reception thereof at the base station. Then, the base station returns an assignment signal as a response to the transmission request signal to the terminal (step S2). At this time, the base station reports the maximum number of bits to be transmitted which are selectable by the terminal, i.e., a transmission rate (Rate) and a transmission permitted time (Time) indicating a period during which data can be transmitted, to the terminal.

The terminal transmits, for example, four data within the transmission permitted time (steps S3 to S6). The base station having received the four data from the terminal returns the ACK signal upon successful reception and the NAK signal upon reception failure. FIG. 1 indicates an example in which first data, second data, and fourth data are received successfully, but third data is received unsuccessfully. Therefore, the base station returns response signals in the order of the ACK signal, ACK signal, NAK signal, and ACK signal (steps S7 to S10).

The terminal receives the NAK signal as the response signal to the third data, and then retransmits the third data under retransmission control. However, in the retransmission control according to the first embodiment, the transmission request signal is not transmitted again unlike the conventional technology, but the third data is autonomously transmitted (step S11). In FIG. 1, the terminal retransmits the third data immediately after the ACK signal corresponding to the fourth data is received, and receives the ACK signal as the response thereto (step S13).

Because fifth data is not yet transmitted after the third data is retransmitted, the terminal transmits a transmission request signal to the base station (step S12), receives an assignment signal as the response thereto (step S14), transmits the fifth data (step S15), and receives the ACK signal as the response thereto (step S16).

Figure 2:
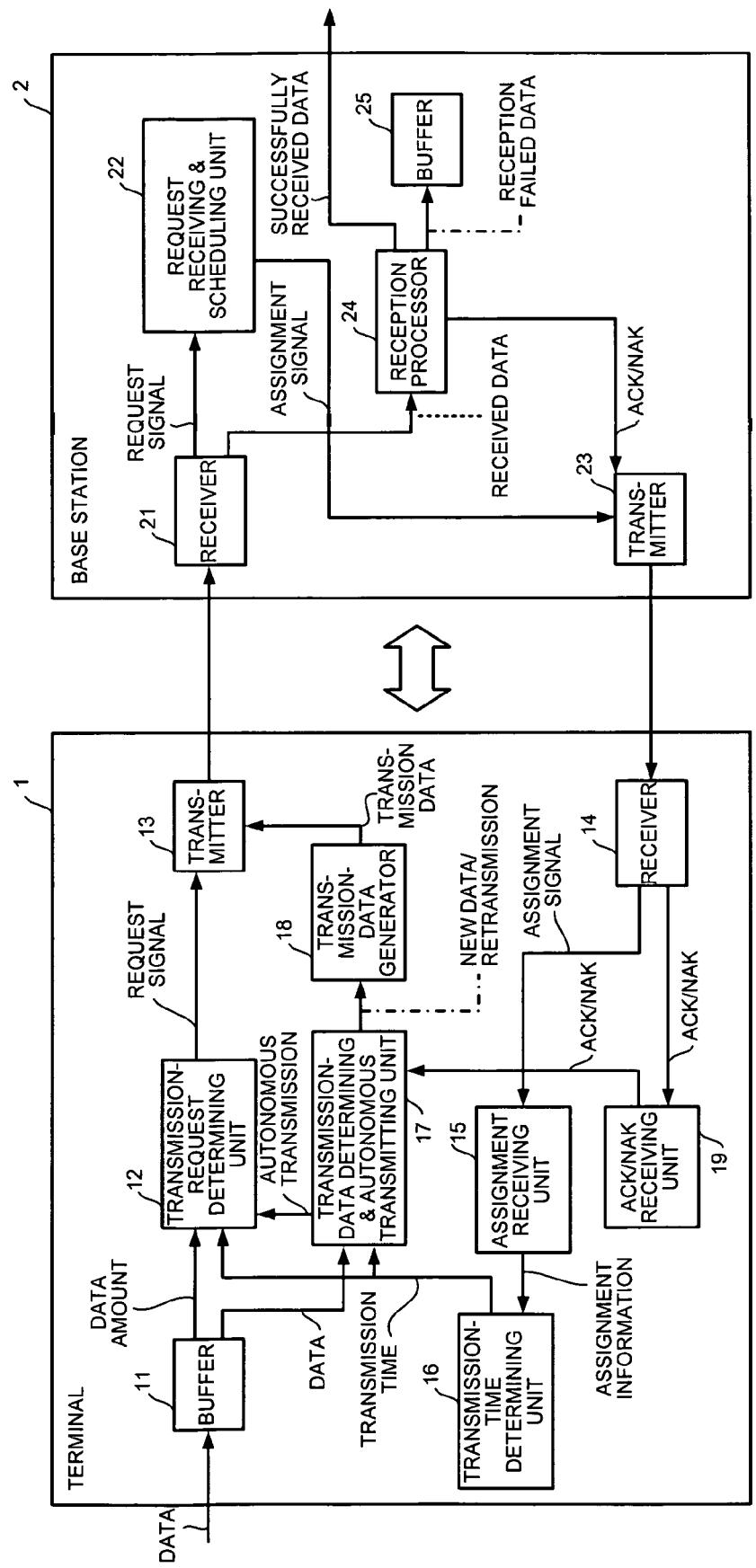
FIG. 2 is a diagram of each configuration of a terminal and a base station according to the first embodiment.

FIG. 2 is a diagram of each configuration of a terminal and a base station according to the first embodiment, allowing implementation of the communication method. A terminal 1 includes a buffer 11, a transmission-request determining unit 12, a transmitter 13, a receiver 14, an assignment receiving unit 15, a transmission-time determining unit 16, a transmission-data determining & autonomous transmitting unit 17, a transmission-data generator 18, and an ACK/NAK receiving unit 19. A base station 2 includes a receiver 21, a request receiving & scheduling unit 22, a transmitter 23, a reception processor 24, and a buffer 25.

The operations of the terminal and the base station configured in the above manner are explained in detail below.

In the terminal 1, data having arrived from an upper layer is accumulated in the buffer 11, and the transmission-request determining unit 12 determines, from the data amount accumulated herein, whether a transmission request should be sent. The transmission-request determining unit 12 acquires information, indicating whether it is within a transmission permitted time, from the transmission-time determining unit 16, to use this information for determination on whether the transmission request should be sent. When the transmission request is to be sent, the terminal 1 transmits the transmission request signal via the transmitter 13 to the base station 2.

The assignment receiving unit 15 receives an assignment signal via the receiver 14. Herein, the assignment receiving unit 15 reads the assignment signal received, and reports the result of reading to the transmission-time determining unit 16. The transmission-time determining unit 16 determines the transmission permitted time assigned and reports the result of determination to the transmission-request determining unit 12 and to the transmission-data determining & autonomous transmitting unit 17.

The transmission-data determining & autonomous transmitting unit 17 acquires data from the buffer 11 within the transmission permitted time, and transfers the data acquired to the transmission-data generator 18. The transmission-data generator 18 generates transmission data and transmits the transmission data generated, after it is subjected to the process for transmission such as encoding for error correction, to the base station 2 via the transmitter 13.

When receiving an ACK/NAK signal as a response to the transmission data, the ACK/NAK receiving unit 19 analyzes the ACK/NAK signal received, and reports the result of analysis to the transmission-data determining & autonomous transmitting unit 17.

The transmission-data determining & autonomous transmitting unit 17 determines whether new data is to be transmitted (when the ACK signal is received) or retransmission data is to be transmitted (when the NAK signal is received), based on the result of analysis. When it is determined that the new data is transmitted, the transmission-data determining & autonomous transmitting unit 17 acquires data from the buffer 11 when it is within the transmission permitted time, and transfers the data acquired to the transmission-data generator 18. When it is out of the transmission permitted time, the transmission-data determining & autonomous transmitting unit 17 instructs so as to send a transmission request again. On the other hand, when it is determined that the retransmission data is transmitted, the transmission-data determining & autonomous transmitting unit 17 autonomously transmits the retransmission data without sending the transmission request even if it is out of the transmission permitted time. When the retransmission data is autonomously transmitted, the transmission-data determining & autonomous transmitting unit 17 reports that effect to the transmission-request determining unit 12, to prevent transmission of a transmission request signal. Accordingly, the retransmission data can be transmitted immediately without sending the transmission request.

On the other hand, the base station 2 receives the transmission request signal via the receiver 21, the request receiving & scheduling unit 22 evaluates the transmission request signal, and reports the assignment signal as the result of evaluation to the terminal 1 via the transmitter 23. When receiving the data, the reception processor 24 performs a predetermined process for reception, and returns the result of reception (success/failure) as the ACK/NAK signal. At this time, the data received successfully is immediately transferred to the upper layer, while the reception-failed data is accumulated in the buffer 25 to be combined with the same data when it is retransmitted.

According to the first embodiment, even when the NAK signal is returned from the base station and the transmission permitted time assigned to a terminal is over, the retransmission data is autonomously transmitted without performing the processes for transmitting the transmission request signal and receiving the assignment signal. Therefore, as compared with the conventional technology in which the processes for sending the transmission request and reception of the assignment signal are executed, the delay time occurring during transmission of the retransmission data can be largely reduced. Moreover, the delay time can be reduced, and thereby the time for using a buffer to accumulate the reception-failed data can be shortened, thus largely improving the buffer use efficiency.

Figure 3:
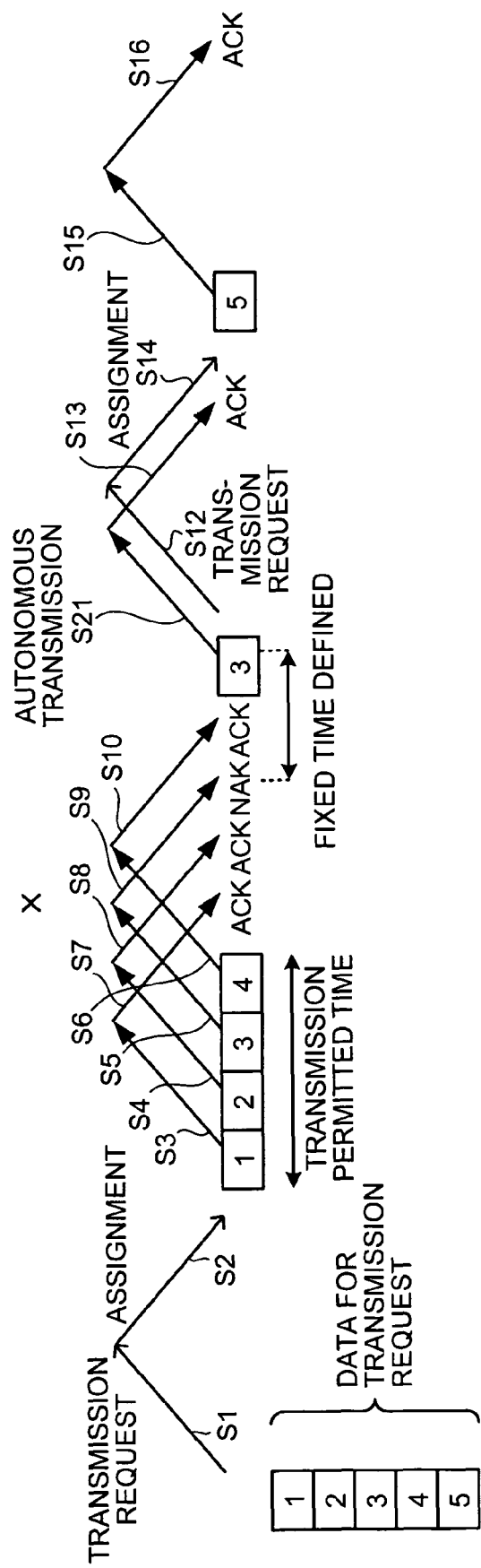
FIG. 3 is a diagram of a communication method according to a second embodiment of the present invention.

A communication method according to a second embodiment of the present invention is explained below. FIG. 3 is a diagram of a communication method according to the second embodiment. According to the second embodiment, only the process different from the first embodiment explained below.

According to the second embodiment, the terminal having received the NAK signal in the process at step S9 transmits retransmission data after a fixed time, which is previously defined between the terminal and the base station, has elapsed since reception of the NAK signal (step S21). The retransmission control is such that the retransmission data is autonomously transmitted without exchanging a transmission request signal and an assignment signal with the base station, in the same manner as that of the process described according to the first embodiment.

Figure 4:
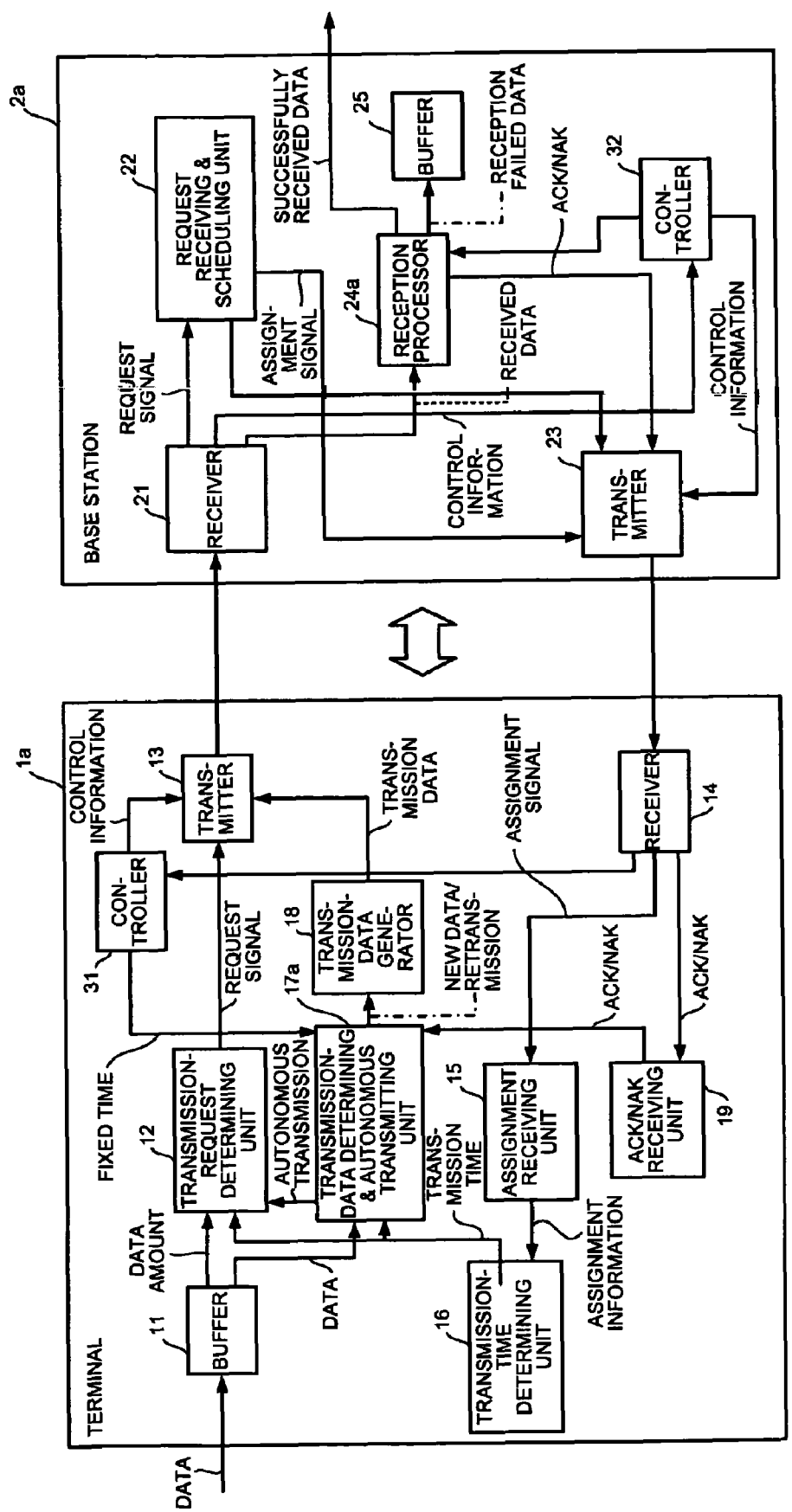
FIG. 4 is a diagram of each configuration of a terminal and a base station according to the second embodiment.
Figure 5:
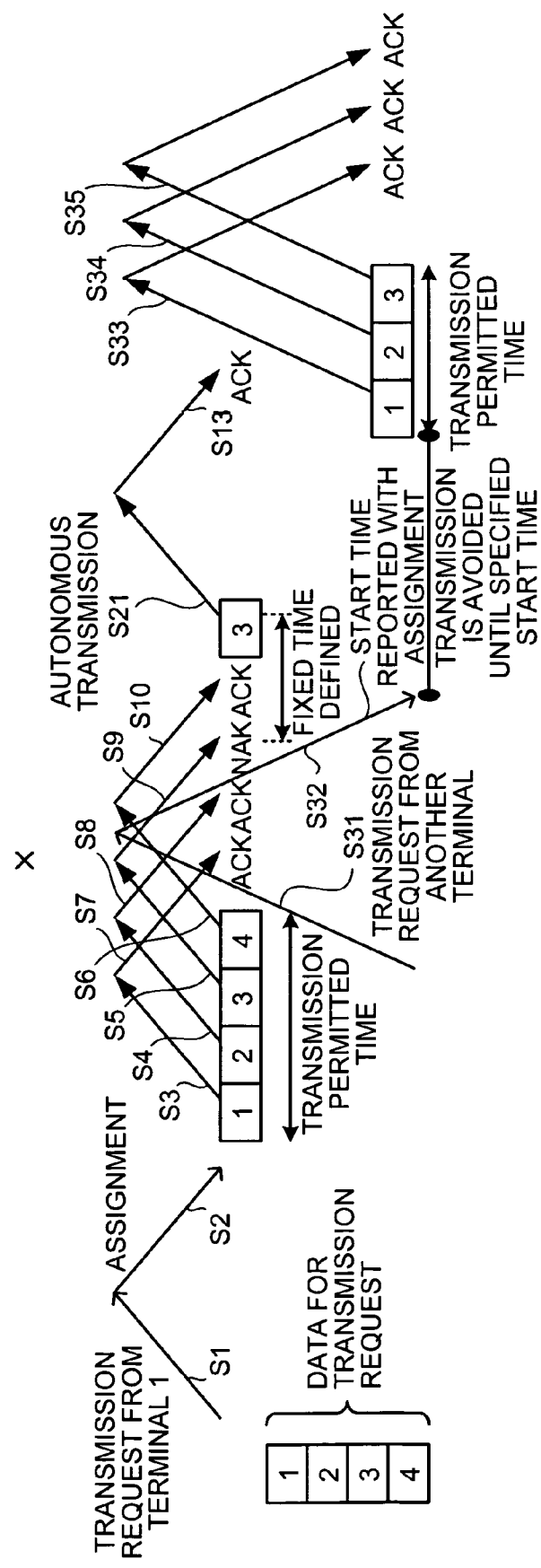
FIG. 5 is a diagram of a communication method according to a third embodiment of the present invention.

FIG. 4 is a diagram of each configuration of a terminal and a base station according to the second embodiment, allowing implementation of the communication method. A terminal 1a includes a controller 31 and a transmission-data determining & autonomous transmitting unit 17a, and a base station 2a includes a controller 32 and a reception processor 24a. It is noted that only the operation different from that according to the first embodiment is explained according to the second embodiment.

The controller 31 of the terminal 1a and the controller 32 of the base station 2a exchange control information before transmission or reception of transmission data, and previously define timing for autonomous transmission. The controller 31 of the terminal 1a reports a fixed time defined, to the transmission-data determining & autonomous transmitting unit 17. When determining that retransmission data is to be transmitted, the transmission-data determining & autonomous transmitting unit 17a autonomously transmits the retransmission data after the fixed time has elapsed since reception of the NAK signal without sending a transmission request even if it is out of the transmission permitted time.

On the other hand, the controller 32 of the base station 2a controls so that the reception processor 24a starts a reception operation after the fixed time has elapsed since transmission of the NAK signal.

According to the second embodiment, as explained above, the timing of autonomously transmitting the retransmission data is set to a time point when a specified fixed time has elapsed since reception of the NAK signal. Consequently, the base station has only to perform the reception operation of the retransmission data after the fixed time has elapsed since transmission of the NAK signal, and efficiently uses a function as a receiver, thus largely reducing power consumption.

The fixed time may be defined as any value if the same value is recognized by both the base station and the terminal. Therefore, the fixed time may be previously communicated between the base station and the terminal, or a specific value is not communicated but a previously stored time may be used.

A communication method according to a third embodiment of the present invention is explained below. According to the third embodiment, only process different from that of the second embodiment is explained below. The configurations of a terminal and a base station according to the third embodiment are the same as these in FIG. 4 of the second embodiment previously explained.

According to the third embodiment, the base station having transmitted the NAK signal to the terminal 1a predicts autonomous transmission from the terminal 1a, and gives transmission permission to any other terminal, excluding a time zone predicted, that transmits a transmission request signal to the base station.

For example, when receiving a transmission request signal from any other terminal (step S31) and when the transmission permitted time for the terminal 1a is over in the time from transmitting the NAK signal to the terminal 1a to receiving the retransmission data, it is predictable in the base station 2a that the retransmission data will be received after a fixed time has elapsed since transmission of the NAK signal.

If a transmission permitted time is assigned to the other terminal in the time from transmitting the NAK signal to the terminal 1a to receiving the retransmission data, the transmission from the terminal 1a and the transmission from the other terminal mutually interfere with each other, which may cause reception failure.

Therefore, according to the third embodiment, the request receiving & scheduling unit 22 of the base station 2a delays the transmission permitted time assigned to the other terminal based on the prediction so as not to overlap the transmission time zone for the retransmission data. More specifically, in addition to a normal transmission rate and a transmission permitted time length, a transmission start time is further reported using an assignment signal (step S32). The transmission start time may be a relative time from reception of the assignment signal, or may be an absolute time that can be shared by the base station 2a and the other terminal.

The other terminal, which is assigned the transmission permitted time, does not perform data transmission until a specified transmission start time, and transmits data having the transmission permitted time length after the specified transmission start time (steps S33 to S36). More specifically, the assignment receiving unit 15 of the other terminal analyzes the transmission start time, and further, the transmission-time determining unit 16 control the transmission-data determining & autonomous transmitting unit 17a and the transmission-request determining unit 12 in consideration of the result of analysis.

According to the third embodiment, the base station predicts that the retransmission data will be received from a terminal being a data transmission source after a fixed time has elapsed since transmission of the NAK signal, and restricts the assignment of the transmission permitted time to other terminals in the time zone predicted. Consequently, interference between the retransmission data and the transmission data from other terminal can be avoided, which allows reduction in probability of reception failure.

Figure 6:
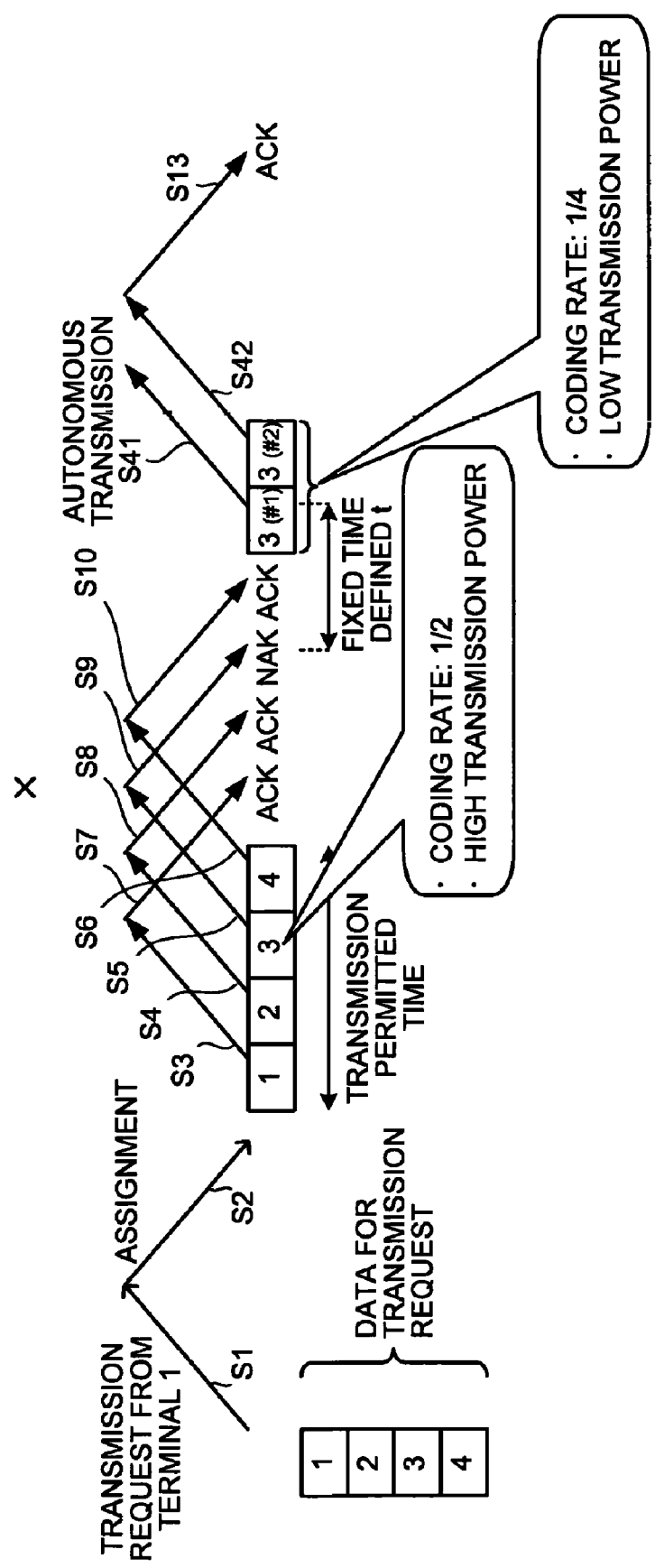
FIG. 6 is a diagram of a communication method according to a fourth embodiment of the present invention.

A communication method according to a fourth embodiment of the present invention is explained below. FIG. 6 is a diagram of a communication method according to the fourth embodiment. According to the fourth embodiment, only process different from that of the first embodiment is explained below.

According to the fourth embodiment, a terminal executes retransmission of the third data in an autonomous transmission mode, in the same manner as above, but at this time, a coding rate is changed. In FIG. 6, as one example, a coding rate upon initial transmission is defined as ½, and according rate upon retransmission is defined as ¼. Therefore, according to the third embodiment, the third data is transmitted using one time slot, but according to the fourth embodiment, the third data is transmitted using two time slots (steps S41, S42).

Figure 7:
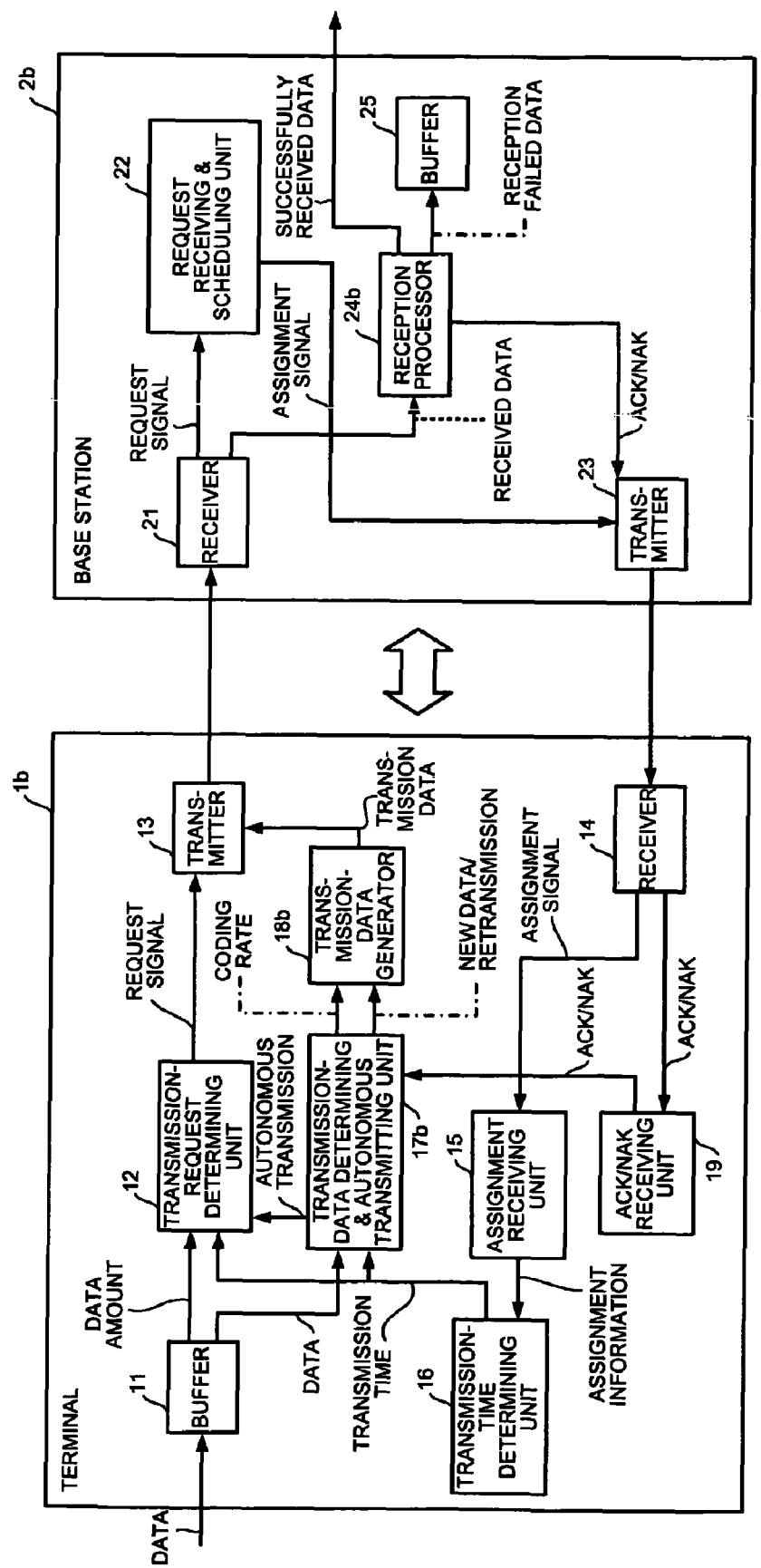
FIG. 7 is a diagram of each configuration of a terminal and a base station according to the fourth embodiment.

FIG. 7 is a diagram of each configuration of a terminal and a base station according to the fourth embodiment, allowing implementation of the communication method. A terminal 1*b* includes a transmission data determining & autonomous transmitting unit 17*b* and a transmission-data generator 18*b*, and a base station 2*b* includes a reception processor 24*b*. It is noted that only the operation different from that according to the first embodiment is explained according to the fourth embodiment.

The transmission-data determining & autonomous transmitting unit 17*b* of the terminal 1*b* reports information for a coding rate to the transmission-data generator 18*b*. The transmission-data generator 18*b* performs the process for error correction encoding on the transmission data based on the coding rate reported. The information for the coding rate may be reported at any time irrespective of new data/retransmission, or may be reported only upon retransmission. On the other hand, the reception processor 24*b* of the base station 2*b* performs error correction decoding on a received signal based on the coding rate defined.

According to the fourth embodiment, the coding rate for error correction upon retransmission is set to a lower value than the coding rate upon initial transmission. The reduction of the coding rate allows improvement of noise tolerance and interference resistance upon reception and demodulation of the third data. Moreover, by using this effect, the transmission power upon retransmission can be set to a lower value than the transmission power upon initial transmission. Thus, if a same target error rate is set upon retransmission and initial transmission, interference affecting data transmission by any other terminal can be reduced.

INDUSTRIAL APPLICABILITY

The communication method according to the present invention is useful for a radio communication system including at least one base station and a plurality of terminals (including one), and it is particularly suitable for the case where retransmission control is employed as an error correction technique for the radio communication system.

The invention claimed is:

1. A communication method for a communication system including a base station and a terminal, the terminal being configured to transmit a data as a new data to the base station, and upon receiving an NAK signal indicating a reception failure from the base station as a response to the transmission of the new data, to transmit the data as a retransmission data to the base station, the communication method comprising:
   a first step
      of transmitting by the base station, in response to a transmission request from the terminal, information on a value of a resource for data transmission that is used for a communication between the base station and the terminal;
   a second step
      of receiving by the terminal, from the base station, information on the value of the resource for data transmission;
   a third step
      of transmitting by the terminal a plurality of data packets as the new data to the base station based on the value of the resource for data transmission, the plurality of data packets excluding ACK and NAK packets; and
   a fourth step
      of assigning, by the terminal and independent of the base station, the resource for autonomous retransmission of a data packet from the plurality of data packets to the base station only in response to reception of the NAK signal from the base station indicating transmission failure of the data packet in the third step, wherein
   the fourth step comprises autonomously retransmitting the data packet from the plurality of data packets without sending a transmission request to the base station for the resource.

2. The communication method according to claim 1, wherein in the fourth step the data packet is autonomously retransmitted after a predetermined time defined between the terminal and the base station has elapsed since reception of the NAK signal.

3. The communication method according to claim 2, further comprising:
   a fifth step of estimating by the base station a transmission time zone for the data packet autonomously retransmitted in the fourth step; and
   a sixth step of transmitting by the base station information on the value of the resource for data transmission to another terminal that requests resource assignment from the base station, the information on the value of the resource for data transmission incorporating the estimated transmission time zone.

4. The communication method according to claim 1, wherein in the fourth step the data packet is autonomously retransmitted at a coding rate lower than an initial coding rate used in the third step.

5. The communication method according to claim 1, wherein the resource represents a transmission permitted time during which data can be transmitted from the terminal to the base station.

6. The communication method according to claim 1, wherein the resource represents a maximum number of bits which is permitted for the terminal to transmit to the base station.

7. The communication method according to claim 1, wherein the resource represents a transmission rate at which data is transmitted from the terminal to the base station.

8. The communication method according to claim 1, wherein in the fourth step the data packet is autonomously retransmitted in response to the reception of the NAK signal and without regard to whether a time slot associated with the resource for data transmission has expired.

9. A communication system, comprising:
a base station; and
a terminal that transmits a data as a new data to the base station, and upon receiving an NAK signal indicating a reception failure from the base station as a response to the transmission of the new data, transmits the data as a retransmission data to the base station, wherein
the base station includes
a first unit to transmit, in response to a transmission request from the terminal, information on a value of a resource for data transmission that is used for a communication between the base station and the terminal,
the terminal includes
a second unit that receives, from the base station, information on the value of the resource for data transmission;
a third unit that transmits a plurality of data packets as the new data to the base station based on the value of the resource for data transmission, the plurality of data packets excluding ACK and NAK packets; and
a fourth unit that assigns independent of the base station the resource for the autonomous retransmission of a data packet from the plurality of data packets to the base station only in response to reception of the NAK signal from the base station indicating transmission failure of the data packet by the third unit, wherein
the fourth unit autonomously retransmits the data packet from the plurality of data packets to the base station without sending a retransmission request to the base station for the resource.

10. The communication system according to claim 9, wherein
the base station further includes a scheduling unit configured to estimate a transmission time zone for the data packet autonomously retransmitted by the terminal, and
the first unit transmits information on the value of the resource for data transmission to another terminal that requests resource assignment from the base station, the information on the value of the resource for data transmission incorporating the estimated transmission time zone estimated by the scheduling unit.

11. The communication method according to claim 9, wherein the resource represents a transmission permitted time during which data can be transmitted from the terminal to the base station.

12. The communication method according to claim 9, wherein the resource represents a maximum number of bits which is permitted for the terminal to transmit to the base station.

13. The communication method according to claim 9, wherein the resource represents a transmission rate at which is transmitted from the terminal to the base station.

14. A communication method for a terminal that builds a communication system with a base station, the terminal transmitting a data as a new data to the base station, and upon receiving an NAK signal indicating a reception failure from the base station as a response to the transmission of the new data, transmitting the data as a retransmission data to the base station, the communication method comprising:
a first step of receiving, from the base station in response to a transmission request from the terminal, information on a value of a resource for data transmission that is used for a communication between the base station and the terminal;
a second step of transmitting a plurality of data packets as the new data to the base station based on the value of the resource for data transmission, the plurality of data packets excluding ACK and NAK packets; and
a third step of assigning, by the terminal and independent of the base station, the resource for autonomous retransmission of a data packet from the plurality of data packets to the base station only in response to reception of the NAK signal from the base station indicating transmission failure of the data packet in the second step, wherein
the third step comprises autonomously retransmitting the data packet from the plurality of data packets without sending a transmission request to the base station for the resource.

15. The communication method according to claim 14, wherein the resource represents a transmission permitted time during which data can be transmitted from the terminal to the base station.

16. The communication method according to claim 14, wherein the resource represents a maximum number of bits which is permitted for the terminal to transmit to the base station.

17. The communication method according to claim 14, wherein the resource represents a transmission rate at which data is transmitted from the terminal to the base station.

18. A terminal that builds a communication system with a base station, the terminal being configured to transmit a data as a new data to the base station, and upon receiving an NAK signal indicating a reception failure from the base station as a response to the transmission of the new data, to transmit the data as a retransmission data to the base station, the terminal comprising:
a first unit that receives, from the base station in response to a transmission request from the terminal, information on a value of a resource for data transmission that is used for a communication between the base station and the terminal;
a second unit that transmits a plurality of data packets as the new data to the base station based on the value of the resource for data transmission, the plurality of data packets excluding ACK and NAK packets; and
a third unit that assigns, independent of the base station, the resource for autonomous retransmission of a data packet from the plurality of data packets to the base station only in response to reception of the NAK signal from the base station indicating transmission failure of the data packet by the second unit, wherein
the third unit autonomously retransmits the data packet from the plurality of data packets to the base station without sending a retransmission request to the base station for the resource.

19. The terminal according to claim 18, wherein the third unit autonomously retransmits the data packet to the base station after a predetermined time has elapsed since the NAK signal is received, the predetermined time being defined between the terminal and the base station.

20. The terminal according to claim 18, wherein the third unit autonomously retransmits the data packet to the base station at a coding rate lower than an initial coding rate used by the second unit.

21. The terminal according to claim 18, wherein the resource represents a transmission permitted time during which data can be transmitted from the terminal to the base station.

22. The terminal according to claim 18, wherein the resource represents a maximum number of bits which is permitted for the terminal to transmit to the base station.

23. The terminal according to claim 18, wherein the resource represents a transmission rate at which data is transmitted from the terminal to the base station.

* * * * *